(12) United States Patent
Inui et al.

(10) Patent No.: US 6,534,757 B2
(45) Date of Patent: *Mar. 18, 2003

(54) IMAGE SENSOR NOISE REDUCTION

(75) Inventors: Fumihiro Inui, Yokohama (JP);
Takamasa Sakuragi, Hiratsuka (JP);
Hiraku Kozuka, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,352

(22) Filed: Jan. 25, 1999

(65) Prior Publication Data
US 2002/0070331 A1 Jun. 13, 2002

(30) Foreign Application Priority Data
Jan. 30, 1998 (JP) ............................. 10-018812

(51) Int. Cl.$^7$ ................................. H01L 27/00
(52) U.S. Cl. .............. 250/208.1; 348/241; 250/214.1
(58) Field of Search ..................... 250/208.1, 208.4, 250/214.1, 214 R, 214 C; 348/241, 262, 294; 358/482, 407, 463

(56) References Cited

U.S. PATENT DOCUMENTS

| | | | | |
|---|---|---|---|---|
| 4,776,031 A | * | 10/1988 | Mita | 382/300 |
| 4,805,025 A | | 2/1989 | Akiyama et al. | 358/213.26 |
| 4,886,986 A | | 12/1989 | Watanabe | 307/353 |
| 5,448,306 A | * | 9/1995 | Koyama | 348/678 |
| 5,569,390 A | * | 10/1996 | Endo | 250/208.1 |
| 5,592,222 A | * | 1/1997 | Nakamura et al. | 348/294 |
| 5,781,312 A | * | 7/1998 | Noda | 358/482 |
| 6,088,057 A | * | 7/2000 | Hieda | 348/243 |

FOREIGN PATENT DOCUMENTS

| | | | |
|---|---|---|---|
| EP | 0714198 A1 | 5/1996 | ............ H04N/1/40 |
| JP | 02-210947 | 8/1990 | |
| JP | 02-210948 | 8/1990 | |
| JP | 02-210949 | 8/1990 | |
| JP | 02-210950 | 8/1990 | |
| JP | 08172504 | 7/1996 | .......... H04N/1/028 |
| JP | 09116757 | 5/1997 | .......... H04N/1/409 |
| JP | 9-116757 | 5/1997 | .......... H04N/1/409 |

* cited by examiner

*Primary Examiner*—Que T. Le
*Assistant Examiner*—Thanh X. Luu
(74) *Attorney, Agent, or Firm*—Fitzpatrick, Cella, Harper & Scinto

(57) ABSTRACT

This invention has as its object to provide an image sensor chip and an image sensor using the image sensor chip capable of reducing random noise in the image sensor chip to obtain a high-quality image. An image sensor chip having a plurality of light-receiving element includes a noise reduction circuit for reducing random noise contained in an output signal from the light-receiving element in the ON state and outputting the random noise contained in the output signal from the light-receiving element without any processing in the OFF state, a first control circuit for controlling the ON/OFF state of the noise reduction circuit, a clamp circuit for clamping an output signal output through the noise reduction circuit to a reference potential, and a second control circuit for controlling an ON/OFF state of the clamp circuit. An image sensor chip and an image sensor formed by arraying a plurality of image sensor chips are also provided.

21 Claims, 7 Drawing Sheets

IMAGE SENSOR NOISE REDUCTION

BACKGROUND OF THE INVENTION

1. Field of the Invention

The present invention relates to an image sensor chip, an image sensor using the same, and methods of driving them and, more particularly, to an image sensor chip for reading an image by photoelectric conversion, an image sensor having a plurality of arrayed image sensor chips, an image sensor chip driving method used therefor, and an image sensor driving method.

2. Related Background Art

Conventionally, a contact-type image sensor (linear image sensor) constituted by arraying light-receiving elements such as photodiodes on a line to directly read image information of an original or the like is often used in an image reading apparatus such as a facsimile apparatus, a digital copying machine, or a scanner. A plurality of image sensor chips serially arrayed in the contact-type image sensor are formed from silicon wafers. For this reason, the sensor length is limited by the wafer size, so an image sensor chip having the same length as the read original width can hardly be manufactured. Hence, conventionally, an imaging optical system is used to form a reduced image of a read original and read the image of the original. However, an apparatus using the reduction imaging optical system requires a space for the optical system and can hardly be made compact. In addition, it is difficult to obtain a sufficient resolution.

To solve the above problems, a so-called contact-type image sensor formed by linearly arraying a plurality of image sensor chips is popularly used. Conventional contact-type image sensors are disclosed in, e.g., Japanese Laid-Open Patent Application No. 2-210947, 2-210948, 2-210949, 2-210950, or "High-Speed, High-Gradation Contact-type Linear Sensor (BASIS Type) Multi-chip Contact Sensor", Journal of Television Society, Vol. 16, No. 58, Sep. 25, 1992.

FIG. 1 is a schematic view showing a conventional image sensor.

Referring to FIG. 1, each of image sensor chips 1-1 to 1-m has n light-receiving elements 2-1-1 to 2-1-n arrayed on a line in the x direction. The chip 1-1 also has a selection circuit 3-1 for sequentially selecting the outputs from the light-receiving elements 2-1-1 to 2-1-n, i.e., reading light signals by the light-receiving elements. The chip 1-1 also has a delay circuit 11-1 for delaying the start signal for the read operation of the light-receiving elements. The chip 1-1 also has a clamp circuit 4-1 for clamping the output signal line of the selection circuit 3-1 to a reference potential Vref after the start signal is input and until the selection circuit 3-1 starts the light signal read operation by the light-receiving elements 2-1-1 to 2-1-n. The image sensor also has an amplification circuit 12-1 which is operated by the start signal to amplify the output from the clamp circuit 4-1. The output from the amplification circuit is output from the chip through an output signal line 5-1.

The delay circuit 11-1 is driven by an external driving circuit through an input signal line 8-1.

A control circuit 6-1 for outputting an ON/OFF switch control signal to the clamp circuit 4-1 is driven by an external driving circuit through the input signal line 8-1.

A control circuit 13-1 for outputting an ON/OFF switch control signal to the amplification circuit 12-1 is driven by an external driving circuit through the input signal line 8-1.

The reference voltage Vref is supplied from an external bias circuit through a reference voltage input line 10-1.

The reference voltage input lines 10-1 to 10-m are short-circuited outside the chips, so the common reference voltage Vref is supplied to all chips.

Each of the image sensor chips 1-2 to 1-m has the same arrangement as that of the image sensor chip 1-1, and the same reference numerals as in the image sensor chip 1-1 denote the same parts in these image sensor chips.

The image sensor chips 1-1 to 1-m are arrayed on a line in the x direction, so a total of n×m light-receiving elements are arrayed on a line in the x direction to form a contact-type image sensor. In reading an image, an original holding the read image is conveyed in the y direction relative to the contact-type image sensor while making the original correspond to the light-receiving elements in units of lines.

The outputs from all light-receiving elements of the image sensor chip 1-1 are sequentially selected by the selection circuit 3-1, and externally output from the output signal line 5-1 through the clamp circuit 4-1 and amplification circuit 12-1. Subsequently, the outputs from all light-receiving elements of the chip 1-2 are sequentially selected by a selection circuit 3-2 and externally output from an output signal line 5-2. In this manner, outputs from all light-receiving elements are time-serially output.

In the conventional so-called contact-type image sensor formed by arraying a plurality of image sensor chips on a line, random noise is generated in the section from each light-receiving element to the clamp circuit of each chip, and a variation in clamp level in units of linearly arrayed image sensor chips appears as shade on the image.

SUMMARY OF THE INVENTION

It is an object of the present invention to provide an image sensor capable of obtaining a high image quality and an image sensor chip for forming the image sensor.

It is another object of the present invention to provide an image sensor for reducing random noise in an image sensor chip of the image sensor and reducing shade on an image due to a variation in clamp level in units of linearly arrayed image sensor chips, and an image sensor chip for forming the image sensor.

It is still another object of the present invention to provide an image sensor or image sensor chip driving method optimum to obtain a high image quality.

In order to achieve the above objects, according to an aspect of the present invention, there is provided an image sensor chip used in an image sensor formed by arraying a plurality of image sensor chips each having a plurality of light-receiving elements, comprising a noise reduction circuit for reducing random noise contained in an output signal from the light-receiving element in an ON state and outputting the random noise contained in the output signal from the light-receiving element without any processing in an OFF state, a first control circuit for controlling the ON/OFF state of the noise reduction circuit, a clamp circuit for clamping an output signal output through the noise reduction circuit to a reference potential, and a second control circuit for controlling an ON/OFF state of the clamp circuit.

According to another aspect, there is provided an image sensor formed by arraying a plurality of image sensor chips each having a plurality of light-receiving elements, comprising a noise reduction circuit for reducing random noise contained in an output signal from the light-receiving element in an ON state and outputting the random noise contained in the output signal from the light-receiving element without any processing in an OFF state, a first control circuit for controlling the ON/OFF state of the noise reduction circuit, a clamp circuit for clamping an output signal output through the noise reduction circuit to a reference potential, and a second control circuit for controlling an ON/OFF state of the clamp circuit.

According to still another aspect, there is provided a method of driving an image sensor chip having a plurality of light-receiving elements comprising a noise reduction circuit for reducing random noise contained in an output signal from the light-receiving element in an ON state and outputting the random noise contained in the output signal from the light-receiving element without any processing in an OFF state, a first control circuit for controlling the ON/OFF state of the noise reduction circuit, a clamp circuit for clamping an output signal output through the noise reduction circuit to a reference potential, and a second control circuit for controlling an ON/OFF state of the clamp circuit, comprising the steps of:

setting the noise reduction circuit in the ON state during only a period except a period when the light-receiving elements read a light signal and setting the noise reduction circuit in the OFF state during the period when the light-receiving elements read the light signal; and setting the clamp circuit in the ON state during only an ON period of the noise reduction circuit and setting the clamp circuit in the OFF state during a period except the ON period of the noise reduction circuit.

According to still another aspect, there is provided a method of driving an image sensor formed by arraying a plurality of image sensor chips each having a plurality of light-receiving elements, the image sensor comprising a noise reduction circuit for reducing random noise contained in an output signal from the light-receiving element in an ON state and outputting the random noise contained in the output signal from the light-receiving element without any processing in an OFF state, a first control circuit for controlling the ON/OFF state of the noise reduction circuit, a clamp circuit for clamping an output signal output through the noise reduction circuit to a reference potential, and a second control circuit for controlling an ON/OFF state of the clamp circuit, comprising the steps of:

setting the noise reduction circuit in the ON state during only a period except a period when the light-receiving elements read a light signal and setting the noise reduction circuit in the OFF state during the period when the light-receiving elements read the light signal; and setting the clamp circuit in the ON state during only an ON period of the noise reduction circuit and setting the clamp circuit in the OFF state during a period except the ON period of the noise reduction circuit.

According to still another aspect, there is provided an image sensor formed by arraying a plurality of image sensor chips each having a plurality of light-receiving elements, comprising:

a noise reduction circuit for reducing random noise contained in an output signal from the light-receiving element using a low-pass filter in an ON state and passing through the random noise contained in the output signal from the light-receiving element without any processing in an OFF state;

first switch means for switching between the ON state and the OFF state;

a clamp circuit for clamping an output signal output through the noise reduction circuit to a reference potential common to the plurality of image sensor chips; and second switch means for switching between an ON state wherein the reference voltage is supplied to the clamp circuit and an OFF state wherein a supply path of the reference voltage is cut.

According to still another aspect, there is provided an image sensor chip comprising:

a plurality of light-receiving elements;

a noise reduction circuit for reducing random noise contained in an output signal from the light-receiving element; and a clamp circuit for clamping a signal to a predetermined reference potential, wherein the output signal from the light-receiving element has an input path leading to the clamp circuit through the reduction circuit and an input path leading to the clamp circuit without the mediacy of the reduction circuit.

According to still another aspect, there is provided an image input apparatus comprising:

(A) an image sensor formed by arraying a plurality of image sensor chips, each image sensor chip including:

(a) a plurality of light-receiving elements:

(b) a noise reduction circuit for reducing random noise contained in an output signal from the light-receiving element; and (c) a clamp circuit for clamping a signal to a predetermined reference potential, wherein the output signal from the light-receiving element has an input path leading to the clamp circuit through the reduction circuit and an input path leading to the clamp circuit without the mediacy of the reduction circuit;

(B) a light source for irradiating an object with light; and (C) a lens array for focusing the light reflected by the object and forming an image of light on the plurality of light-receiving elements in the image sensor.

Other objects, features, and advantages of the present invention will be apparent from the following specification and accompanying drawings.

DESCRIPTION OF THE PREFERRED EMBODIMENTS

Figure 1:
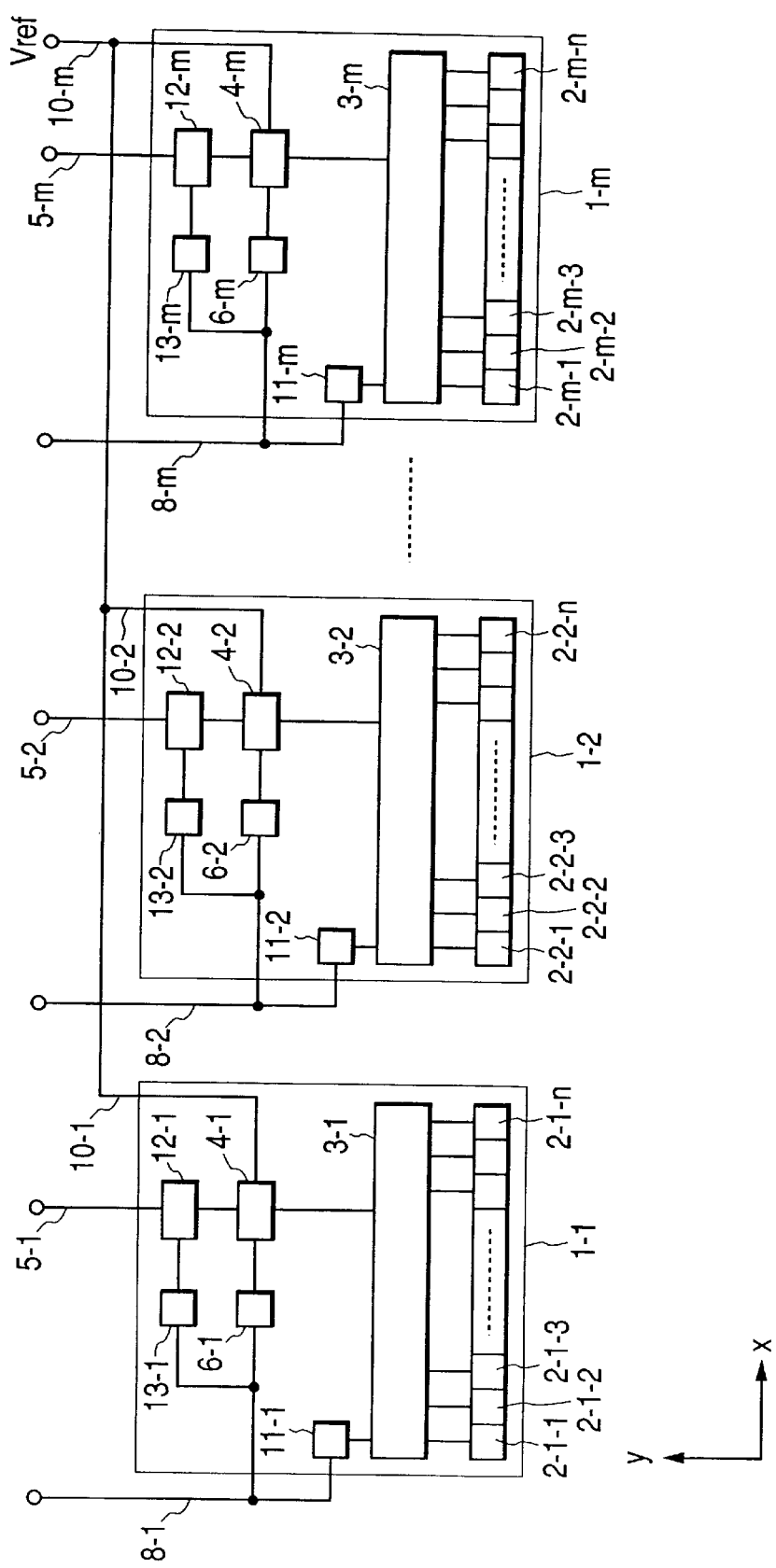
FIG. 1 is a schematic view showing a conventional image sensor.
Figure 2:
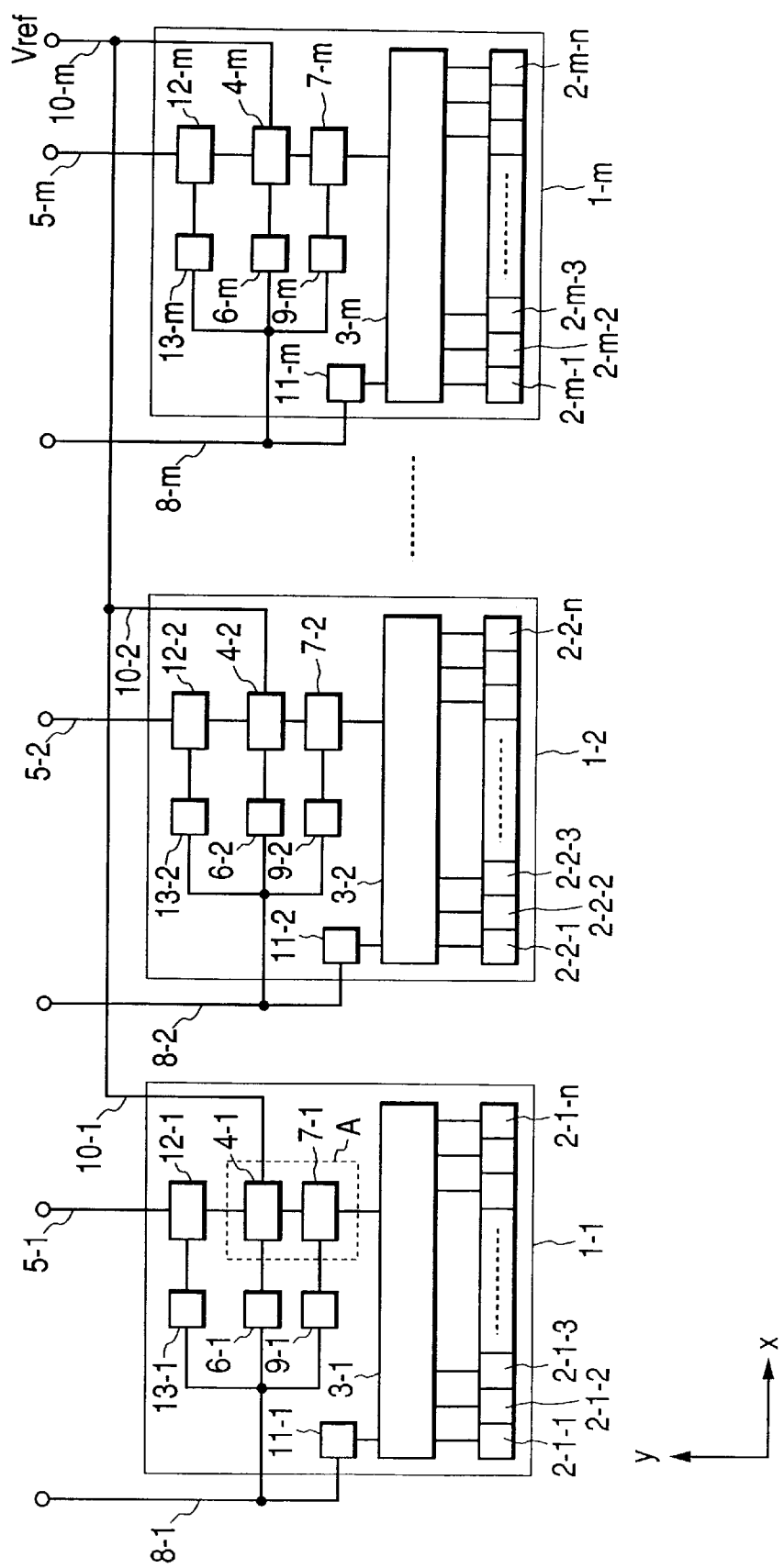
FIG. 2 is a schematic view showing an image sensor according to the first embodiment of the present invention.

FIG. 2 is a schematic view showing an image sensor according to the first embodiment of the present invention. Referring to FIG. 2, an image sensor chip 1-1 has n light-receiving elements 2-1-1 to 2-1-n as photoelectric conversion elements such as photodiodes or phototransistors arrayed on one line in the x direction. The chip 1-1 also has a selection circuit 3-1 for sequentially time-serially selecting the outputs from the light-receiving elements 2-1-1 to 2-1-n, i.e., reading light signals by the light-receiving elements. A transfer switch for transferring optical charges detected by a light-receiving element, a source follower amplification circuit for converting the transferred optical charges into a voltage and outputting the voltage to the selection circuit, and a selection switch for activating the amplification circuit and selectively outputting the voltage may be inserted into the path from the light-receiving element to the selection circuit to output a signal voltage corresponding to the optical charges from the light-receiving element. A capacitor for temporarily storing the signal voltage is used for the selection circuit 3-1, so a time-series signal voltage can be obtained by a scanning switch for outputting the voltage to the signal output line using a shift register (not shown).

The image sensor chip 1-1 has a delay circuit 11-1 for delaying the start signal for the read operation by the light-receiving elements. The delay time of the start signal corresponds to the time until noise is reduced and a level to be clamped is detected. The chip 1-1 also has a noise reduction circuit 7-1 for reducing random noise contained in the output signal line of the selection circuit 3-1 after the start signal is input and until the selection circuit 3-1 starts light signal reading by the light-receiving elements. Also, a clamp circuit 4-1 is formed to clamp the signal voltage from the output signal line connected to the noise reduction circuit 7-1 to a reference potential Vref supplied from an external circuit of the chip during the operation of the noise reduction circuit 7-1.

An amplification circuit 12-1 which is activated by the start signal to amplify the output from the clamp circuit 4-1 is also formed. The output from the amplification circuit 12-1 is output from the chip through an output signal line 5-1.

The delay circuit 11-1 is driven by an external driving circuit through an input signal line 8-1. A control circuit 9-1 for outputting an ON/OFF switch control signal to the noise reduction circuit 7-1 is driven by an external driving circuit through the input signal line 8-1.

A control circuit 6-1 for outputting an ON/OFF switch control signal to the clamp circuit 4-1 is driven by an external driving circuit through the input signal line 8-1. A control circuit 13-1 for outputting an ON/OFF switch control signal to the amplification circuit 12-1 is driven by an external driving circuit through the input signal line 8-1.

The reference voltage Vref is supplied from an external bias circuit through a reference voltage input line 10-1. The reference voltage input lines 10-1 to 10-m to which the reference voltage Vref is supplied are short-circuited outside the chips, so the common reference voltage Vref is supplied to all chips.

Each of the image sensor chips 1-2 to 1-m has the same arrangement as that of the image sensor chip 1-1, and the same reference numerals as in the image sensor chip 1-1 denote the same parts in these image sensor chips.

The image sensor chips 1-1 to 1-m are arrayed on a line in the x direction, so a total of n×m light-receiving elements are arrayed on a line in the x direction. In reading an image, an original bearing the read image is conveyed in the y direction relative to the image sensor while making the original correspond to the light-receiving elements in units of lines. Assume that one line corresponds to the A4 width of 210 mm, the image read resolution is 600 dpi, and the number of chips is 15. One light-receiving element is present in a width of 42.3 μm, so about 333 light-receiving elements are arrayed in a one chip width of 14 mm.

The outputs from all light-receiving elements of the image sensor chip 1-1 are sequentially selected by the selection circuit 3-1 one by one in units of light-receiving elements and output from the chip through the output signal line 5-1. Subsequently, the outputs from all light-receiving elements of the next chip 1-2 are sequentially selected by a selection circuit 3-2 one by one in units of light-receiving elements and output from the chip through an output signal line 5-2. In this manner, the outputs from all light-receiving elements of one line are time-serially output.

Figure 3:
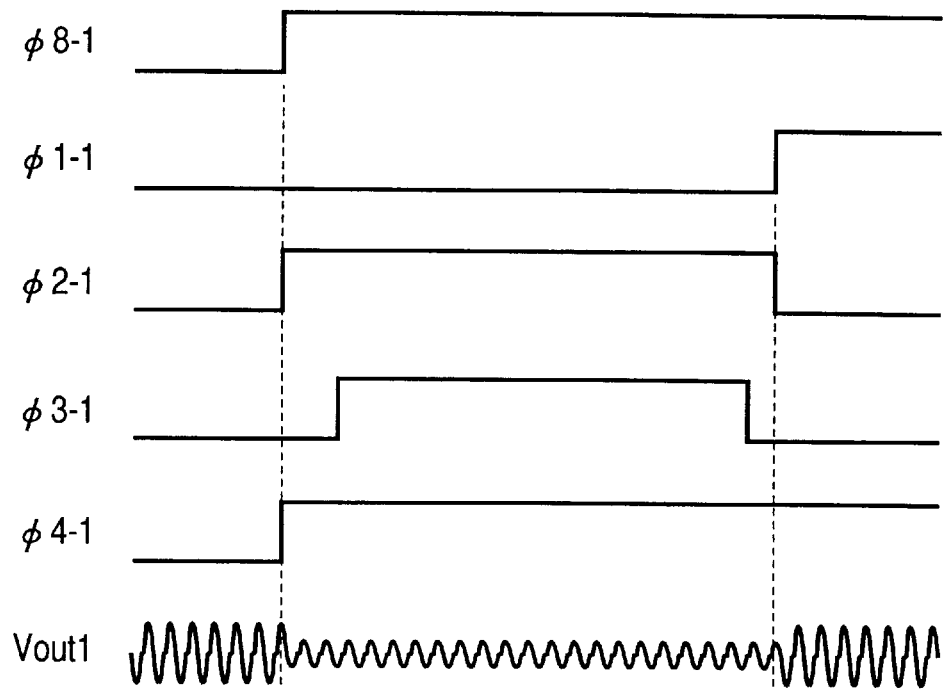
FIG. 3 is a timing chart for explaining the operation of the first embodiment.

FIG. 3 is a timing chart for explaining the operation of this embodiment. Referring to FIG. 3, φ8-1 is a start signal of the input signal line 8-1, φ1-1 is an output control signal from the delay circuit 11-1 in the image sensor chip 1-1, φ2-1 is an output control signal from the first control circuit 9-1 in the image sensor chip 1-1, φ3-1 is an output control signal from the second control circuit 6-1 in the image sensor chip 1-1, φ4-1 is an output control signal from the third control circuit 13-1 in the image sensor chip 1-1, and Vout1 is an output from the noise reduction circuit 7-1 in the image sensor chip 1-1.

The output control signal φ1-1 is generated by the delay circuit 11-1 driven by the input signal line 8-1, i.e., output with a predetermined delay time after the input of the start signal. During only this period, light signals are read by the light-receiving elements.

The output control signal φ2-1 from the first control circuit 9-1 is output in synchronism with the start signal of the input signal line 8-1, i.e., output during only a specific period after the start signal is input and until the selection circuit 3-1 starts light signal reading by the light-receiving elements. During only this period, the noise reduction circuit 7-1 is activated to output Vout1 whose noise is reduced by, e.g., a noise filter for removing high-frequency noise.

The output control signal φ3-1 from the second control circuit 6-1 is output in synchronism with the start signal of the input signal line 8-1 or in synchronism with the start signal with a short delay, i.e., during only a specific period in the ON period of the noise reduction circuit 7-1. During only this period, the clamp circuit 4-1 is activated to clamp the output Vout1 after noise reduction to the reference potential Vref. When the output Vout1 is clamped to the reference potential Vref, a light reception voltage is read from each light-receiving element in the chip on the basis of the sum of the output Vout1 and reference potential Vref.

The output control signal φ4-1 from the third control circuit 13-1 is output in synchronism with the start signal of the input signal line 8-1. That is, the amplification circuit 12-1 is activated simultaneously with input of the start signal.

As shown in FIG. 3, output of the signal φ3-1 is ended when or before output of the signal φ2-1 is ended.

Subsequently, in the image sensor chips 1-2 to 1-m, output control signals φ2-2 to φ2-m from first control circuits 9-2 to 9-m and output control signals φ3-2 to 3-m from second control circuit 6-2 to 6-m are output in synchronism with the start signals of input signal lines 8-2 to 8-m, respectively, clamp circuits φ4-2 to 4-m are activated during the ON period of noise reduction circuits 7-2 to 7-m, respectively, and outputs Vout2 to Voutm after noise reduction are clamped to the reference potential Vref.

The operation of each noise reduction circuit and clamp voltage detection are completed before the read of the final light-receiving element in the preceding image sensor chip is ended. Subsequent to the read of the final light-receiving element in the preceding chip, the first light-receiving element in the next image sensor chip is read using the clamp voltage of this chip. Hence, the read timings for a series of light-receiving elements suffer no delay.

In the above-described manner, in each image sensor chip, the noise reduction circuit is activated during a specific period after the start signal is input and until the light-receiving elements start reading light signals, and the output signal after noise reduction is clamped to the reference voltage by the clamp circuit. With this operation, a variation in clamp level in units of linearly arrayed image sensor chips due to random noise contained in the section from each light-receiving element to the clamp circuit is reduced, so shade differences in light amount between the chips can be decreased.

Figure 4:
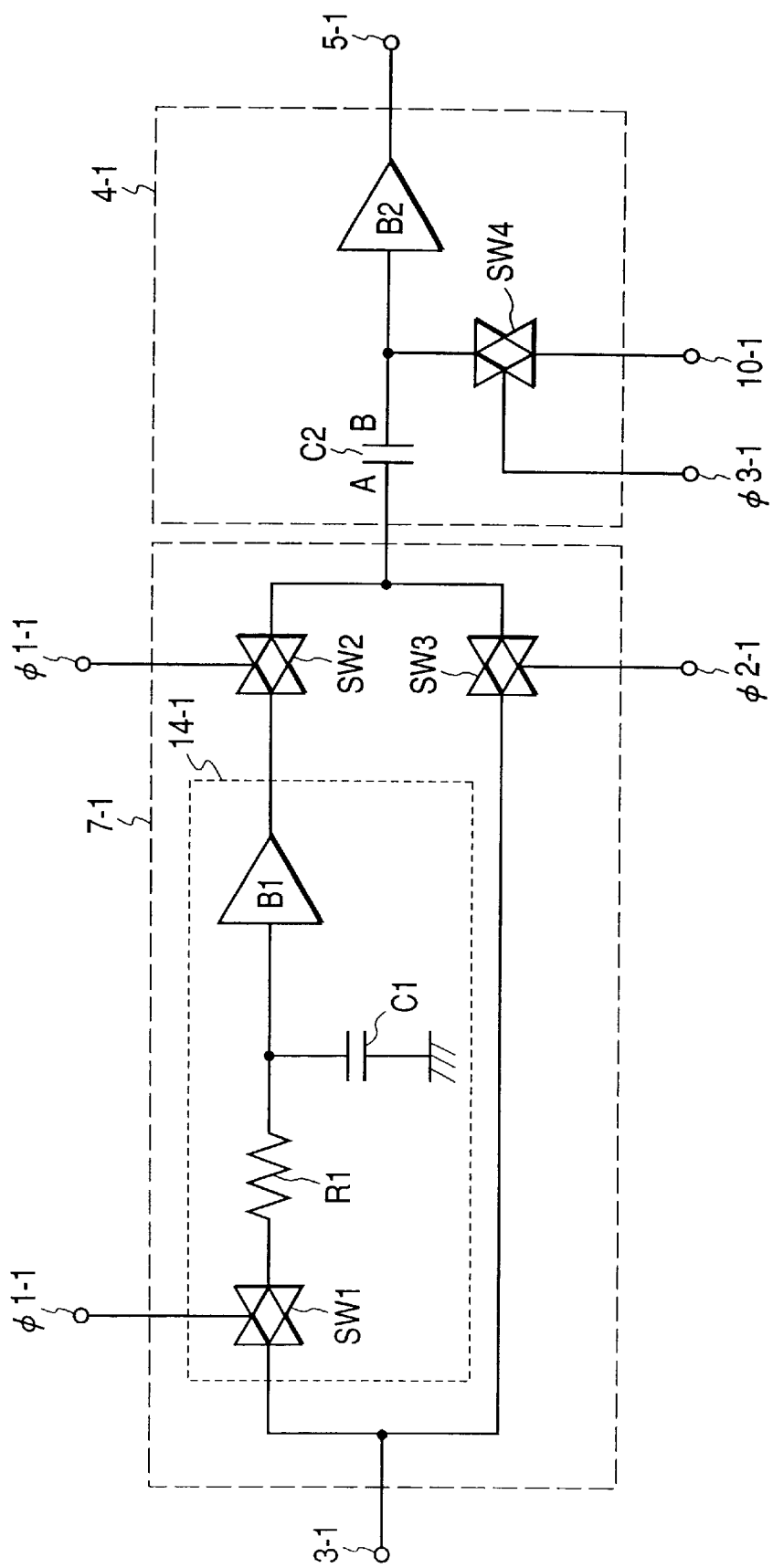
FIG. 4 is a circuit diagram showing an image sensor and, more particularly, a noise reduction circuit and clamp circuit according to the second embodiment of the present invention.

FIG. 4 is a circuit diagram showing an image sensor and, more particularly, a noise reduction circuit and clamp circuit according to the second embodiment of the present invention. This embodiment is different from the first embodiment in a block A represented by a dotted line in the first embodiment, and FIG. 4 shows only a corresponding block of the second embodiment.

Referring to FIG. 4, a noise reduction circuit 7-1 is constructed by a low-pass filter circuit 14-1 comprising a first analog switch circuit SW1, a resistor R1, a capacitor C1, and an output buffer circuit B1, and second and third analog switches SW2 and SW3. The transfer path, in the noise reduction circuit, of the signal time-serially output from each light-receiving element through a selection circuit 3-1 is controlled by the second and third analog switches. More specifically, when the first and second analog switches are in a conducting state (ON), and the third analog switch is in an unconducting state (OFF), the output signal from the selection circuit 3-1 is output from the noise reduction circuit through the low-pass filter circuit. On the other hand, when the first and second analog switches are OFF, and the third analog switch is ON, the output signal from the selection circuit is output from the noise reduction circuit through the third analog switch without any processing.

A clamp circuit 4-1 is comprised of a coupling capacitor C2, a fourth analog switch circuit SW4, and an output buffer circuit B2. The output signal from the noise reduction circuit is input to one terminal (point A) of the coupling capacitor C2 of the clamp circuit 4-1, so only the AC component of the output signal is output from the other terminal (point B). The fourth analog switch circuit is connected between the point B and a reference potential input line 10-1. When the fourth analog switch is ON, the potential at the point B is short-circuited to a reference potential Vref. When the fourth analog switch is OFF, the point B is open to the reference potential Vref. That is, the potential at the point B can be clamped to the reference potential Vref by turning on the fourth analog switch and then turning off the fourth analog switch.

A control circuit 9-1 for outputting an ON/OFF switch control signal to the first, second, and third analog switches in the noise reduction circuit 7-1 is driven by an external driving circuit through an input signal line 8-1.

A control circuit 6-1 for outputting an ON/OFF switch control signal to the fourth analog switch in the clamp circuit 4-1 is driven by an external driving circuit through the input signal line 8-1.

The reference voltage Vref is supplied from an external bias circuit through the reference voltage input line 10-1.

The reference voltage input lines 10-1 to 10-m are short-circuited outside the chips, so the common reference voltage Vref is supplied to all chips.

Figure 5:
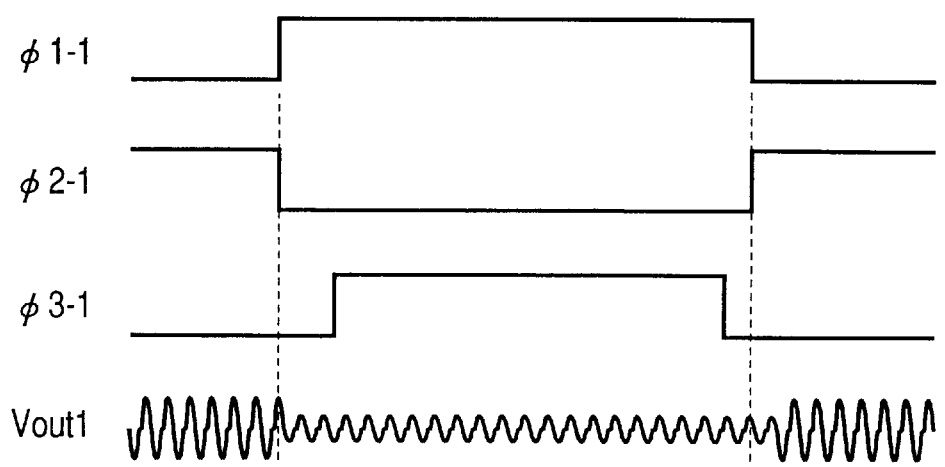
FIG. 5 is a timing chart for explaining the operation of the second embodiment.

FIG. 5 is a timing chart for explaining are example of the operation of the second embodiment. Referring to FIG. 5, φ1-1 is an output control signal output from the first control circuit 9-1 in an image sensor chip 1-1 to control the ON/OFF state of the first and second analog switches, φ2-1 is an output control signal output from the first control circuit 9-1 in the image sensor chip 1-1 to control the ON/OFF state of the third analog switch, φ3-1 is an output control signal output from the second control circuit 6-1 in the image sensor chip 1-1 to control the fourth analog switch, and Vout1 is an output from the noise reduction circuit 7-1 in the image sensor chip 1-1.

The signals φ1-1 and φ2-1 are output in synchronism with the start signal of the input line 8-1, i.e., output during only a specific period except a period when the light-receiving elements of the chip 1-1 read light signals. The first and second analog switches are turned on, and the third analog switch is turned off. The noise reduction circuit 7-1 is activated to obtain an output Vout1 whose noise is reduced.

The signal φ3-1 is output in synchronism with the start signal of the input line 8-1 or in synchronism with the start signal with a short delay, i.e., during only a specific period in the ON period of the noise reduction circuit 7-1. When the fourth analog switch is turned on and then turned off, the output Vout1 after noise reduction is clamped to the reference potential Vref.

As described above, when the low-pass filter circuit 14-1 built by a resistor and a capacitor is used in the noise reduction circuit 7-1, the band of the output signal from the selection circuit 3-1 is limited. When the output signal after noise reduction is clamped to the reference potential by the clamp circuit, a variation in clamp level in units of linearly arrayed image sensor chips due to random noise contained in the section from each light-receiving element to the clamp circuit can be reduced.

In this embodiment as well, the operation of each noise reduction circuit and clamp voltage detection are completed before the read of the final light-receiving element in the preceding image sensor chip is ended. Subsequent to the read of the final light-receiving element in the preceding chip, the first light-receiving element in the next image sensor chip is read using the clamp voltage of this chip. Hence, the read timings for a series of light-receiving elements have no delay.

Figure 6:
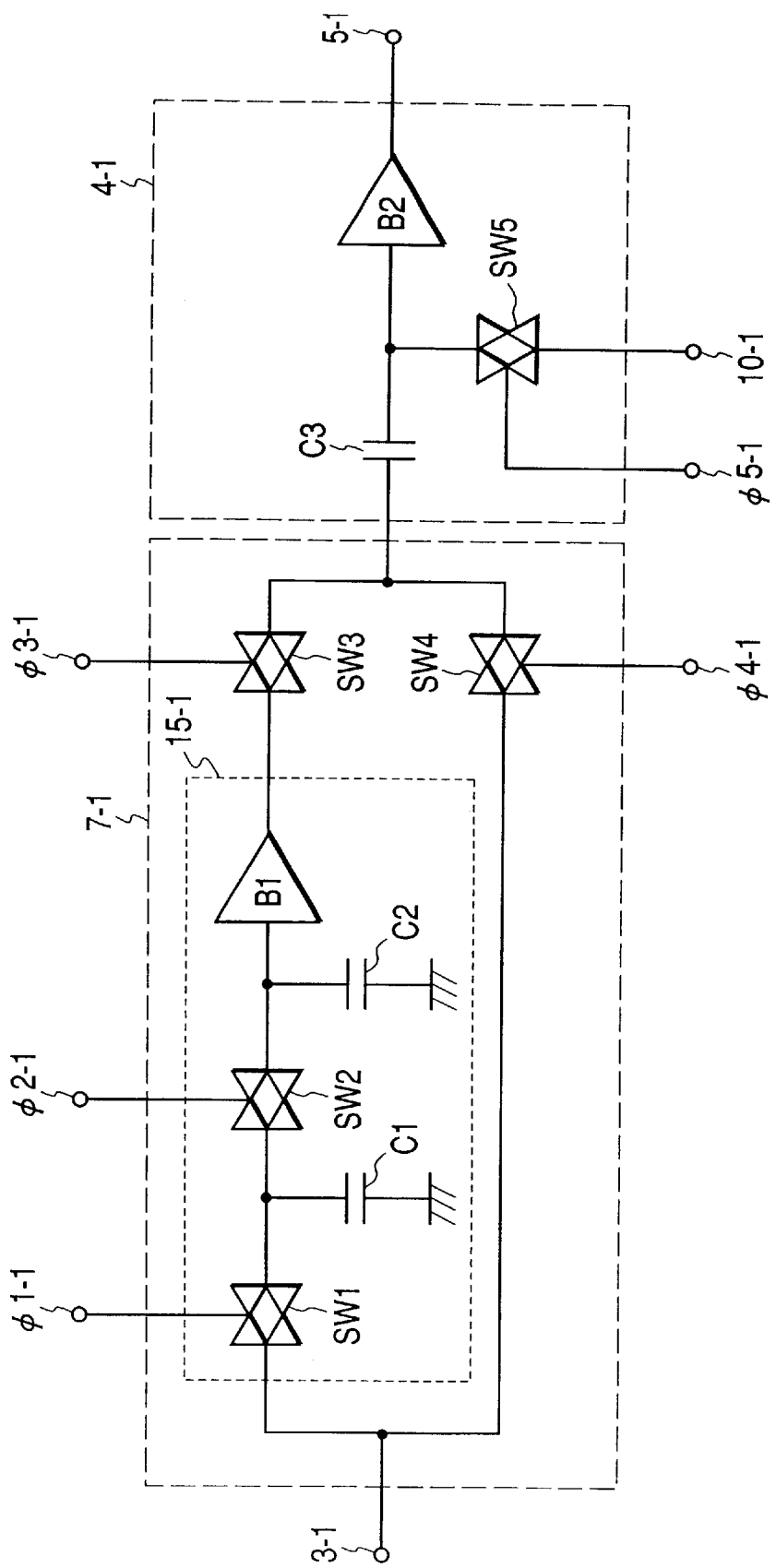
FIG. 6 is a block diagram showing an image sensor and, more particularly, a noise reduction circuit and clamp circuit according to the third embodiment of the present invention.

FIG. 6 is a circuit diagram showing an image sensor and, more particularly, a noise reduction circuit and clamp circuit according to the third embodiment of the present invention.

This embodiment is different from the first embodiment in a block A represented by a dotted line in the first embodiment, and FIG. 6 shows only a corresponding block of the third embodiment.

Referring to FIG. 6, a noise reduction circuit 7-1 is constituted by an averaging circuit 15-1 comprising first and second analog switch circuits SW1 and SW2, first and second capacitors C1 and C2, and an output buffer circuit B1, and third and fourth analog switch circuits SW3 and SW4. In the averaging circuit 15-1, first, the first and second analog switches are simultaneously turned on to send the output signal from a selection circuit 3-1 to the first and second capacitors. Then, the first and second analog switches are turned off to store a potential V1 of the output signal in the first and second capacitors. After this, the first analog switch is turned on, and the second analog switch is turned off to send the output signal from the selection circuit to the first capacitor. Subsequently, the first analog switch is turned off to store a potential V2 of the output signal in the first capacitor.

Next, the first analog switch is turned off, and the second analog switch is turned on to short-circuit the first and second capacitors, so the potential V2 of the output signal stored in the first capacitor and the potential V1 of the output signal stored in the second capacitor are averaged. Finally, the second analog switch is turned off to store the average value of the potentials V1 and V2 of the output signals in the first and second capacitors.

In the above-described manner, potentials V3 to Vk of output signals are stored in the first capacitor at the OFF timing of the first analog switch, and the average value of each potential and the potential of the second capacitor is stored. With this operation, the average value of the potentials stored in the first capacitor at the respective timings is stored in the second capacitor. The transfer path, in the noise reduction circuit, of the signal output from the selection circuit is controlled by the third and fourth analog switches. More specifically, when the third analog switch is ON, and the fourth analog switch is OFF, the output signal from the selection circuit is output from the noise reduction circuit through the averaging circuit.

On the other hand, when the third analog switch is OFF, and the fourth analog switch is ON, the output signal from the selection circuit is output from the noise reduction circuit through the fourth analog switch without any processing. A clamp circuit 4-1 is composed of a coupling capacitor C3, a fifth analog switch circuit SW5, and an output buffer circuit B2. The output signal from the noise reduction circuit is input to one terminal (point A) of the coupling capacitor of the clamp circuit, so only the AC component of the output signal is output from the other terminal (point B). The fifth analog switch circuit is connected between the point B and a reference potential input line 10-1. When the fifth analog switch is ON, the potential at the point B is short-circuited to a reference potential Vref. When the fifth analog switch is OFF, the point B is open to the reference potential Vref. That is, the potential at the point B can be clamped to the reference potential Vref by turning on the fifth analog switch and then turning off the fifth analog switch.

A control circuit 9-1 for outputting an ON/OFF switch control signal to the first, second, third, and fourth analog switches in the noise reduction circuit 7-1 is driven by an external driving circuit through an input signal line 8-1.

A control circuit 6-1 for outputting an ON/OFF switch control signal to the fifth analog switch in the clamp circuit 4-1 is driven by an external driving circuit through the input signal line 8-1.

The reference voltage Vref is supplied from an external bias circuit through the reference voltage input line 10-1.

The reference voltage input lines 10-1 to 10-m are short-circuited outside the chips, so the common reference voltage Vref is supplied to all chips.

Figure 7:
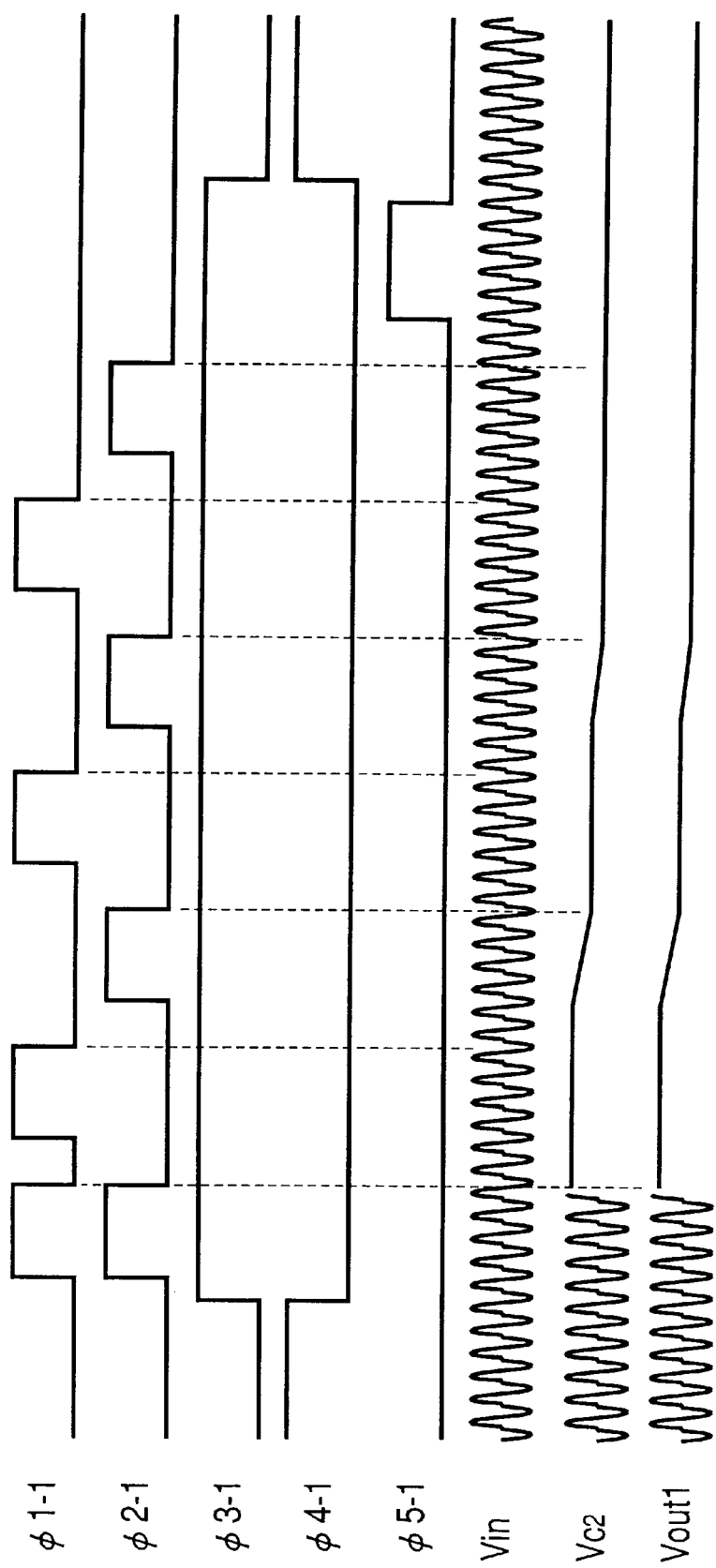
FIG. 7 is a timing chart for explaining the operation of the third embodiment.

FIG. 7 is a timing chart for explaining one example of the operation of the third embodiment. Referring to FIG. 7, $\phi$1-1 is an output control signal output from the first control circuit 9-1 in an image sensor chip 1-1 to control the ON/OFF state of the first analog switch, $\phi$2-1 is an output control signal output from the first control circuit 9-1 in the image sensor chip 1-1 to control the ON/OFF state of the second analog switch, $\phi$3-1 is an output control signal output from the first control circuit 9-1 in the image sensor chip 1-1 to control the ON/OFF state of the third analog switch, $\phi$4-1 is an output control signal output from the first control circuit 9-1 in the image sensor chip 1-1 to control the ON/OFF state of the fourth analog switch, $\phi$5-1 is an output control signal output from the second control circuit 6-1 in the image sensor chip 1-1 to control the ON/OFF state of the fifth analog switch, Vin is an input to the noise reduction circuit 7-1 in the image sensor chip 1-1, $VC_{C2}$ is a potential of the second capacitor of the noise reduction circuit 7-1 in the image sensor chip 1-1, and Vout1 is an output from the noise reduction circuit 7-1 in the image sensor chip 1-1.

The signals $\phi$1-1 and $\phi$2-1 are output in synchronism with the start signal of the input signal line 8-1, i.e., output during only a specific period except a period when the light-receiving elements of the chip 1-1 read light signals, to operate the averaging circuit. The potentials V1 to Vk of the output signals are stored in the first capacitor at the OFF timing of the first analog switch. The average value of each of the potentials V1 to Vk stored in the first capacitor at the respective timing and the potential of the second capacitor is input, so the average value of the potentials stored in the first capacitor at the respective timings is stored in the second capacitor.

The signals $\phi$3-1 and $\phi$4-1 are output in synchronism with the start signal of the input signal line 8-1, i.e., output during only a specific period except a period when the light-receiving elements of the chip 1-1 read light signals. The third analog switch is turned on, and the fourth analog switch is turned off. The noise reduction circuit 7-1 is activated to obtain an output Vout1 whose noise is reduced.

The signal $\phi$5-1 is output in synchronism with the start signal of the input signal line 8-1, i.e., during only a specific period in the ON period of the noise reduction circuit 7-1. When the fifth analog switch is turned on and then turned off, the output Vout1 after noise reduction is clamped to the reference potential Vref.

In this way, the averaging circuit built by the first and second analog switch circuits, first and second capacitors, and the output buffer circuit is used to sample the potential of the output signal from the selection circuit 3-1 a plurality of number of times. The average value of the sample values is calculated to reduce noise of the output signal. When the output signal after noise reduction is clamped to the reference potential by the clamp circuit, a variation in clamp level in units of linearly arrayed image sensor chips due to random noise contained in the section from each light-receiving element to the clamp circuit can be reduced. Shade differences in image signal amount between the chips can be decreased, and a uniform image signal can be obtained for one line. Hence, a high-quality image signal without any variations can be obtained as an entire two-dimensional image by the image sensor.

As described above, according to the first to third embodiments, while the clamp circuit for clamping the output signal from a light-receiving element in each image sensor chip is in operation, the noise reduction circuit for reducing random noise contained in the output signal from the light-receiving element is activated. With this arrangement, any shade on the image due to a variation in clamp level in units of linearly arrayed image sensor chips can be reduced.

In addition, shade differences in image signal amount between the chips can be decreased, and a uniform image signal can be obtained for one line from the image sensor chip string formed by linearly arraying a plurality of chips. Hence, a high-quality image signal without any variations can be obtained as an entire two-dimensional image by the image sensor.

In the first to third embodiments, instead of forming the first control circuit 9-1, second control circuit 6-1, and third control circuit 13-1 in the image sensor chip, the noise reduction circuit 7-1, clamp circuit 4-1, and control circuit 13-1 may be controlled by external control signals.

The noise reduction circuit is not limited to the circuit arrangement of the second or third embodiment and may have another circuit arrangement capable of reducing random noise.

An image input apparatus using the image sensor described in any one of the first to third embodiments will be described as the fourth embodiment of the present invention.

Figure 8:
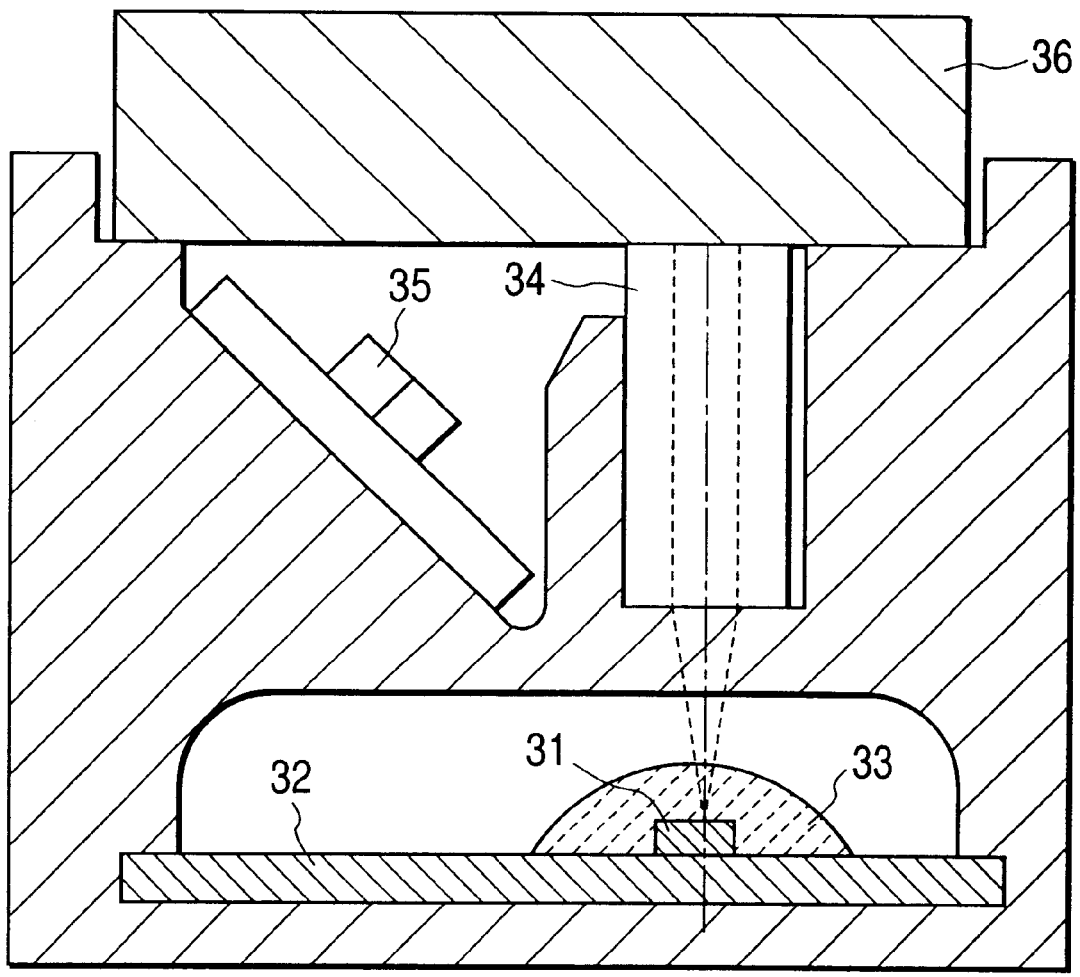
FIG. 8 is a view showing an image input apparatus using an image sensor.

An image input apparatus shown in FIG. 8 comprises a transparent supporter 36, an LED light source 35 for irradiating the supporter 36 with red, green, and blue light beams, a lens array 34 for focusing the light reflected by an original and forming the image of light on the surface of a light-receiving element, an image sensor 31 arranged on a ceramic substrate 32 to photoelectrically convert the reflected light focused by the lens array 34, a chip coat agent 33 such as silicone resin for protecting the image sensor 31, and a case 37. These members are assembled into an image input apparatus.

When the LED light source 35 emits only red light, the image sensor 31 is driven to read red information. Subsequently, green and blue information are read. When the pieces of color information of the original are synthesized by image processing, the color original can be read without using any color filters.

In this embodiment, as a signal for controlling the start of emission of the LED light source 35, the start signal for the first chip of the image sensor described in any one of the first to third embodiments is used. As a signal for controlling the end of emission of the LED light source 35, a signal output from a selection circuit 3-m for reading a signal from the final light-receiving element of the mth chip is used. With this arrangement, only when all image sensor chips 1-1 to 1-m on the mounting substrate 32 are in operation, the LED light source 35 is turned on.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus, comprising:
   first and second image sensor chips, each of said first and second image sensor chips including a plurality of light-receiving elements;
   a noise reduction circuit adapted to reduce noise contained in an output of each of said first and second image sensor chips;
   an adjustment circuit adapted to adjust signals read out from the plurality of light-receiving elements included in each of first and second image sensor chips by using a signal output from said noise reduction circuit; and
   a drive circuit adapted to effect control so that signals from the plurality of light-receiving elements included in said second image sensor chip are read out after signals of the plurality of light-receiving elements included in said first image sensor chip are read out, and said noise reduction circuit reduces noise contained in the output of the second image sensor chip in a read-out period of the image signals of the plurality of light-receiving elements included in the first image sensor chip.

2. An apparatus according to claim 1, further comprising a selection circuit for sequentially selecting output signals from said plurality of light-receiving elements included in each of the first and second image sensor chips and inputting the signal to said noise reduction circuit.

3. An apparatus according to claim 1, wherein said noise reduction circuit comprises a low-pass filter circuit adapted to limit a frequency band of the output of each of the first and second image sensor chips.

4. An apparatus according to claim 1, wherein said noise reduction circuit comprises:
   an averaging circuit adapted to average the output of each of said first and second image sensor chips.

5. An apparatus according to claim 1, wherein the noise is random noise that is generated in a signal line between the plurality of light-receiving elements and said noise reduction circuit.

6. An apparatus according to claim 1, wherein said noise reduction circuit and said adjustment circuit is arranged in common to said plurality of light-receiving elements.

7. An apparatus according to claim 1, wherein each of said first and second image sensor chips includes a delay circuit, and wherein said drive circuit effects the control so that said noise reduction circuit reduces the noise contained in the output of each of said first and second image sensor chips, in a time period during which said delay circuit delays a start signal for read-out of the signal from the plurality of light-receiving elements after the delay circuit receives the start signal.

8. An apparatus according to claim 1, further comprising a light source adapted to illuminate an object and a lens array adapted to focus light reflected from said object onto said plurality of light-receiving elements.

9. An apparatus according to claim 1, wherein said adjustment circuit includes a clamp circuit adapted to clamp the signal output from said noise reduction circuit to a reference voltage.

10. An apparatus according to claim 9, wherein said noise reduction circuit includes a low-pass filter circuit adapted to limit a frequency band.

11. An apparatus according to claim 9, wherein said noise reduction circuit includes an average circuit adapted to average a signal.

12. An apparatus according to claim 1, wherein at least one noise reduction circuit and one adjustment circuit are arranged for each said first and second image sensor chips.

13. An apparatus according to claim 1, wherein each said first and second image sensor chips includes an output signal line adapted to output signals from the plurality of light-receiving elements, and the signal generated in each said first and second image sensor chips includes a signal which is on said output signal line before the signals of the plurality of light-receiving elements are read out to said output signal line.

14. A method of driving an image input apparatus comprising:

a first and second image sensor chips, each of which includes a plurality of light-receiving elements;

a noise reduction circuit adapted to reduce noise contained in an output of each of said first and second image sensor chips; and an adjustment circuit adapted to adjust signals read out from the plurality of light-receiving elements included in each of the first and second image sensor chips by using a signal output from said noise reduction circuit, comprising:

a driving step of driving each of said first and second image sensor chips; and a drive control step of effecting drive control so that signals of the plurality of light-receiving elements included in said second image sensor chip are read out after signals of the plurality of light-receiving elements included in said first image sensor chip are read out, and said noise reduction circuit reduces noise contained in the output of the second image sensor chip in a read-out period of the image signals of the plurality of light-receiving elements included in the first image sensor chip.

15. A method according to claim 14, wherein said image sensor chip further comprises a selection circuit for sequentially selecting output signals from said plurality of light-receiving elements included in each of the first and second image sensor chips and inputting the signals to said noise reduction circuit.

16. A method according to claim 14, wherein said noise reduction circuit comprises a lower-pass filter circuit adapted to limit a frequency band of the output of each of the first and second image sensor chips.

17. A method according to claim 14, wherein said noise reduction circuit comprises:

an average circuit adapted to average the output of each of the first and second image sensor chips.

18. A method according to claim 14, wherein the noise is random noise that generates in a signal line between the plurality of light-receiving elements and said noise reduction circuit.

19. A method according to claim 14, wherein said noise reduction circuit and said adjustment circuit is arranged in common to said plurality of light-receiving elements.

20. A method according to claim 14, wherein each of said first and second image sensor chips includes a delay circuit, and wherein said drive control step includes a step of effecting the control so that said noise reduction circuit the noise contained in the output of each of said image sensor chips, in a time period during which said delay circuit delays a start signal for read-out of the signal from the plurality of light-receiving elements after the delay circuit receives the start signal.

21. A method according to claim 14, wherein said image input apparatus further comprising a light source adapted to illuminate an object and a lens array adapted to focus light reflected from said object onto said plurality of light-receiving elements.

* * * * *

UNITED STATES PATENT AND TRADEMARK OFFICE
CERTIFICATE OF CORRECTION

PATENT NO. : 6,534,757 B2
DATED : March 18, 2003
INVENTOR(S) : Fumihiro Inui et al.

It is certified that error appears in the above-identified patent and that said Letters Patent is hereby corrected as shown below:

Title page,
Item [56], FOREIGN PATENT DOCUMENTS, "08172504" should read
-- 08-172504 --; "09116757 5/1997" should be deleted.
OTHER PUBLICATIONS, insert -- S. Kikuchi et al., "High Speed, High Gradation Contact Type Linear Image Sensor BASIS Multi-Chip Contact Sensor", Journal of Television Society, Vol. 16, No. 58, September 25, 1992. --
Item [57], ABSTRACT,
Line 5, "element" should read -- elements --.

Column 3,
Line 38, "comprising" should read -- comprising: --.

Column 4,
Line 32, "elements:" should read -- elements; --.

Column 8,
Line 12, "are" should read -- the --.

Column 11,
Line 3, "amount" should read -- amounts --.

Column 12,
Lines 57, 58 and 61, "each" should read -- each of --.

Signed and Sealed this

Twenty-eighth Day of October, 2003

JAMES E. ROGAN
*Director of the United States Patent and Trademark Office*